March 27, 1934.　　　R. CHILTON　　　1,952,839
ENGINE STARTING APPARATUS
Filed Jan. 30, 1929
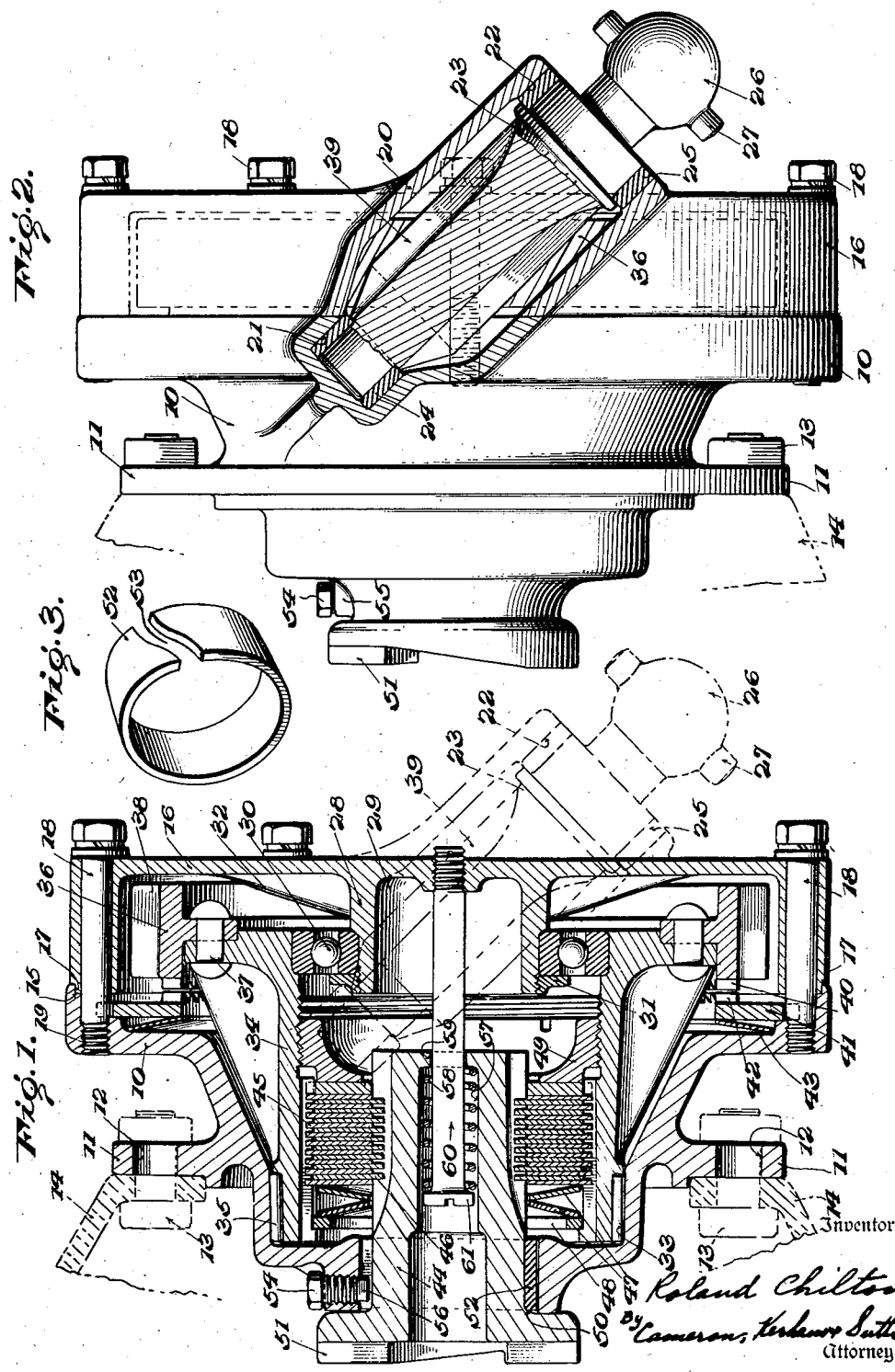

Patented Mar. 27, 1934

1,952,839

UNITED STATES PATENT OFFICE 1,952,839

ENGINE STARTING APPARATUS

Roland Chilton, Keyport, N. J., assignor, by mesne assignments, to Eclipse Machine Company, Elmira Heights, N. Y., a corporation of New York Application January 30, 1929, Serial No. 336,307

5 Claims. (Cl. 123—185)

This invention relates to starters for engines, and more particularly to starter mechanism for aeroplane engines in which special requirements as to weight, size and strength must be met.

It is an object of this invention to provide a starter mechanism of the above character which is small and light but powerful and positive in action.

Another object is to provide such a device which is readily adjustable to adapt it to small spaces and various angular positions.

Another object is to provide such a device in which the starter is normally disconnected from the engine, and the engagement is effected automatically and in a positive manner by the initial actuation of the starter.

Other objects and advantages will be apparent to those skilled in this art from the following description taken in connection with the accompanying drawing in which:

Fig. 1 is a substantially medial longitudinal section of the device;

Fig. 2 is a side elevation thereof, partly broken away to show the arrangement of the driving gears; and Fig. 3 is a perspective detail of the clutch shifting sleeve.

Referring first to Fig. 1 of the drawing, 10 indicates a casing member of generally cup-shaped form provided with a radial flange 11 having a series of openings 12 therein through which bolts 13 are adapted to pass and clamp the starter against an engine casing 14. The outer rim of the casing 10 is provided with a shouldered surface 15, and a shallow cup-shaped closure member 16 having a surface 17 is adapted to fit tightly thereagainst and be clamped thereto by suitable means such as cap screws 18 passing through the closure member 16 and threaded within suitable openings 19 in the casing 10.

Casing 10 and closure member 16 are formed to provide therebetween an obliquely arranged off-set housing 20 (Fig. 2) having a bearing seat 21 in the portion formed by the casing 10, and having a larger bearing seat 22 in that portion formed by the closure member 16.

A driving member in the form of a pinion shaft 23 is rotatably mounted in the housing 20 by means of suitable bearings 24 and 25 within the seats 21 and 22, respectively. The member 23 is provided with a driving connection of any suitable form such as a spherical head 26 having a transverse driving pin 27 adapted for connection with any suitable cranking mechanism such as a hand crank or a motor operated shaft.

The closure member 16 is provided with a centrally located annular flange 28 extending toward the casing 10 and providing a bearing seat 29 for a suitable antifriction thrust and radial bearing 30 which is fixed thereon by suitable means such as the ring 31 threaded on the end of the flange 28 and clamping the stationary member of the antifriction bearing against a shoulder thereon. The bearing flange 28 may, if desired, be provided with suitable strengthening ribs 32 forming a rigid connection with the body of the closure member 16.

Casing 10 is provided with a bearing seat 33 substantially in alinement with the bearing 30, and a barrel member 34 is rotatably mounted on the bearing 30 and on a suitable bearing 35 in the bearing seat 33, endwise motion of the barrel member to the right in Fig. 1 being prevented by the bearing 30 and motion to the left being prevented by the bearing 35. A spur gear member 36 is mounted on the barrel 34, being integrally formed therewith, or suitably fixed thereto as by means of rivets 37, and is provided with teeth 38 adapted to mesh with the teeth 39 of the pinion shaft 23 and thus cause the pinion shaft to drive the barrel member 34. The relative sizes of the pinion shaft 23 and the gear member 36, and the inclination of the teeth 38 and 39 are so selected that a suitable gear reduction is secured between the driving shaft and the barrel member 34 so that the power source can develop sufficient torque for the purpose designed, with a proper overload factor. However, the inclination of the teeth 38 and 39 is preferably made so that the gearing is not self-locking.

The gear member 36 is provided on the side adjacent the casing 10 with an annular series of ratchet teeth 40. A ring member 41 having ratchet teeth 42 is mounted in the outer end of casing 10 and is splined thereto by the cap screws 18 on which said ring is slidable to bring its ratchet teeth 42 into and out of engagement with the ratchet teeth 40. A dished spring washer 43 is arranged between the casing 10 and the ratchet ring 41 to yieldably press the ratchet teeth 40 and 42 into engagement with each other. The inclination of the ratchet teeth is such as to allow the gear member 36 is overrun the ratchet ring 41 in a counterclockwise direction as viewed from the right in Fig. 1, but to prevent rotation in the opposite direction. For clearness of illustration the ratchet teeth are shown in disengaged position but it will be understood that spring 43 normally maintains the same in yielding engagement.

A connecting element in the form of a clutch member 44 is slidably mounted within the barrel 34, and is connected to rotate therewith by means of a multiple disk friction clutch consisting of friction disks 45 and 46 splined respectively to the barrel 34 and clutch member 44. The clutch disks are maintained under a pre-set pressure by suitable means such as dished spring washers 47 which bear against a ring 48 seated against a shoulder in one end of the barrel 34, and an adjusting ring 49 threaded within the opposite end of said barrel. The clutch is set to slip when subjected to an overload as in case of a backfire.

The clutch member 44 extends through a suitable opening 50 in casing 10, and is provided with suitable clutch jaws 51 for providing unidirectional driving connection with an engine shaft when projected into engagement therewith. A split elastic sleeve 52 (Fig. 3) is mounted on clutch member 44 in frictional engagement therewith within the opening 50 of casing 10 and is provided with an angularly inclined slot 53 therein. A key member 54 projects through a suitable boss 55 of the casing 10 and is provided at its inner end with a smooth, cylindrical portion 56 adapted to extend within the inclined slot 53 of ring 52. The inclinations of the slot 53 and portion 56 are such that rotation of sleeve 52 due to its frictional engagement with the clutch member 44 in a counterclockwise direction as viewed from the right in Fig. 1, will cause sleeve 52 to be projected outwardly to the left and thus cause the clutch member 44 to move outwardly into engagement with an engine shaft, not shown.

Clutch member 44 is provided with a central bore 57, and a coil spring 58 is seated therein, bearing at one end against a shoulder 59 within said clutch member. A stud 60 extends through the bore in clutch member 44 and is threaded and suitably locked within an alined opening in the closure member 16. Head 61 of the stud 60 is adapted to bear on the other end of the spring 58, and thus maintain the clutch member 44 normally in its retracted position.

In operation, rotation of the pinion shaft 23 in a clockwise direction will cause counterclockwise rotation of gear member 36 and barrel 34, which rotation is transmitted to the clutch member 44 through the friction disks 45 and 46 normally without slippage thereof. The initial rotation of clutch member 44 causes the sleeve 52 to bear against the stud 54 and thus move outwardly because of the inclination of the slot 53. This outward motion, being transmitted to the clutch member 44, causes it to be projected into engagement with the engine shaft, whereby further rotation of the clutch member 44 is transmitted thereto. If the engine should backfire for any reason while the clutch jaw 51 is in engagement with the engine shaft, the clutch member 44 will be rotated in a reverse direction, and will tend to rotate the barrel 34 reversely. Backward rotation of the barrel 34, however, is prevented by the ratchet teeth 40 and 42, so that the clutch disks 45 and 46 are caused to slip on each other thus quickly stopping the reverse rotation of the engine, while protecting the cranking mechanism and the operator from injury thereby. When the engine starts and overruns the clutch jaw 51, the clutch member 44 is returned to its retracted position due to the inclination of the teeth of said clutch jaw and the retracting spring 58.

It will be noted that since the driving gearing is reversible in character, the ratchet teeth 42 assume the entire load in case of backfire, and transmit it directly to the casing 10 without setting up any longitudinal or weaving stresses. It will be noted also that the inclined arrangement of the pinion shaft 23 in conjunction with the angular adjustment of casing 10 by reason of its circular mounting upon the engine housing, allows a wide variation in the angular position assumed by the shaft 23, and thus renders the starter adaptable to different situations and relationships with respect to the fuselage, in the event the structure is employed on aeroplanes, and the engine mounting.

While only one embodiment of the invention has been shown and described in detail, it is to be expressly understood that the illustrated embodiment is not exclusive, and various other embodiments will now present themselves to those skilled in the art, while changes may be made in the construction, arrangement and proportions of parts, and certain features used without other features, without departing from the spirit of the invention. Reference is therefore to be had to the claims hereto appended for a definition of the limits of the invention.

What is claimed is:

1. A starter for internal combustion engines including a casing one part of which is of annular cross-section, a closure member for said casing, said closure member also being of annular cross-section and including a second annular part formed concentrically thereof, and of a less diameter than that of the annular portion of said casing, an engine engaging member projecting from said casing and disposed concentrically of the annular portion of said casing, a driving gear disposed within the closure member, and a driving connection between said gear and engine engaging member, said driving connection including a barrel surrounding the inner portion of said engine engaging member and drivably connected therewith, bearing means interposed between the annular portion of said casing and the outer surface of said barrel, and additional bearing means engaging the inner surface of said barrel and the centrally formed annular portion of said closure member.

2. A starter for internal combustion engines including a casing, a closure member for said casing, said closure member including an annular part formed concentrically thereof, an engine engaging member projecting from said casing and disposed concentrically of the annular portion of said closure member, a driving member disposed within said closure member, a driving connection between said driving member and engine engaging member, said driving connection including a barrel surrounding the inner portion of said engine engaging member and drivably connected therewith, bearing means interposed between said casing and the outer surface of said barrel, and additional bearing means engaging the inner surface of said barrel and the annular portion of said closure member.

3. A starter for internal combustion engines including a casing one part of which is of annular cross-section, a closure member for said casing, said closure member also being of annular cross-section and including a second annular part formed concentrically thereof, and of a less diameter than that of the annular portion of said casing, an engine engaging member projecting from said casing and disposed concentrically of the annular portion of said casing, a gear disposed within the closure member, a driving connection between said gear and engine engaging member, said driving connection including a barrel surrounding the inner portion of said engine engaging member and drivably connected therewith, bearing means interposed between the annular portion of said casing and the outer surface of said barrel, and driving means connecting with said gear, said driving means being mounted in oblique relation to said casing and closure member.

4. A starter for internal combustion engines including a casing, a closure member for said casing, said closure member including an annular part formed concentrically thereof, and of a less diameter than the casing, an engine engaging member projecting from said casing and disposed concentrically of the casing, a gear disposed within the closure member, a driving connection between said gear and engine engaging member, said driving connection including a barrel surrounding the inner portion of said engine engaging member and drivably connected therewith, bearing means engaging the inner surface of said barrel and the centrally formed annular portion of said closure member, and driving means for said gear mounted on said casing and closure member, and extending obliquely therefrom.

5. A starter for internal combustion engines including a casing, a closure member for said casing, said closure member including an annular portion formed concentrically thereof, an engine engaging member projecting from said casing and disposed concentrically of the annular portion of said closure member, a gear disposed within said closure member, a driving connection between said gear and engine engaging member, bearing means interposed between said driving connection and the annular portion of said closure member, and driving means for said gear mounted on said casing and closure member, and extending obliquely therefrom.

ROLAND CHILTON.